United States Patent [19]

Quaglino

[11] Patent Number: 4,813,026

[45] Date of Patent: Mar. 14, 1989

[54] METHOD FOR LOGARITHMIC ANALYSIS OF SEISMIC REFLECTION SIGNALS

[75] Inventor: Carl A. Quaglino, Dallas, Tex.

[73] Assignee: Mobil Oil Corporation, New York, N.Y.

[21] Appl. No.: 125,902

[22] Filed: Nov. 27, 1987

[51] Int. Cl.$^4$ .............................................. G01V 1/24
[52] U.S. Cl. ...................................... 367/29; 367/47; 367/67; 364/421
[58] Field of Search .......................... 367/21, 29–30, 367/47, 67, 608; 364/421, 722, 33 W

[56] References Cited

U.S. PATENT DOCUMENTS

| | | | |
|---|---|---|---|
| 3,506,085 | 4/1970 | Loper | 181/0.5 |
| 4,010,462 | 3/1977 | Armistead | 367/67 |
| 4,134,098 | 1/1979 | Ruehle | 340/7 R |
| 4,218,765 | 8/1980 | Kinkade | 367/421 |
| 4,357,689 | 11/1982 | Ruehle | 367/23 |
| 4,397,007 | 8/1983 | Goode et al. | 367/68 |
| 4,405,999 | 9/1983 | Zachariadis | 367/23 |
| 4,601,023 | 7/1986 | Bowman | 367/47 |
| 4,628,492 | 12/1986 | Winney | 367/63 |
| 4,636,993 | 1/1987 | Lumley et al. | 367/47 |
| 4,685,329 | 8/1987 | Bugess | 73/151 |
| 4,759,636 | 7/1988 | Ahew et al. | 367/21 |

OTHER PUBLICATIONS

Sheriff R. E., "Encyclopedic Dictionary of Explorator Geophysics", 1973, pp. 130–224, Seg.

*Primary Examiner*—Nelson Moskowitz
*Attorney, Agent, or Firm*—Alexander J. McKillop; Michael G. Gilman; George W. Hager, Jr.

[57] ABSTRACT

A seismic marine survey is carried out by traversing a line of exploration with an acoustic energy source, an array of spaced-apart receivers, and a recording system. Seismic reflection signals recorded by the receivers are digitized to provide a plurality of digital data samples. A logarithmic value is determined for each digital data sample. These logarithmic values are plotted to provide a seismogram with the seismic reflection signals being recorded in side-by-side trace relationship.

2 Claims, 6 Drawing Sheets

METHOD FOR LOGARITHMIC ANALYSIS OF SEISMIC REFLECTION SIGNALS

RELATED APPLICATION

This application is related to U.S. patent application Ser. No. 125,903 filed simultaneously with this application.

BACKGROUND OF THE INVENTION

This invention relates to seismic exploration for oil and gas, and more particularly to a method for processing and displaying seismic data obtained along a seismic line of exploration.

In seismic exploration, acoustic energy is imparted into the earth at a plurality of acoustic energy generating positions (i.e. shot points) along a desired line of exploration. Such acoustic energy is reflected at interfaces between rock layers of varying acoustic impedance. Its return to the surface of the earth can be detected by seismic receivers, commonly referred to as geophones when used in land exploration and as hydrophones when used in marine exploration. The recorded output of such a seismic receiver is referred to as a seismic trace. When the trace is recorded in analog form on a magnetic tape, there is a continuous record written on the tape of an output voltage of a seismic amplifier used in conjunction with the recording of the electrical signals generated by the seismic receivers. When processed in analog form, these electrical signals are operated upon, for example, by filtering, to present them in form for use by geophysicists. With the advent of digital recording of seismic data, a discontinuous record of the signal is written that measures the seismic amplifier output voltage only at discrete intervals. The digitally recorded data may be operated upon to present the data in form for use by geophysicists. The recording of the seismic energy is commonly displayed as a seismogram having a plurality of traces printed side by side thereon and having a means superimposed thereon for timing the recorded events. The recorded event of energy reflected from a reflecting interface, hereafter referred to as from a subsurface formation, is a relatively high amplitude wavelet peak, commonly referred to as a reflection. If the plurality of traces are corrected for differing source-to-receiver distances, the reflection peaks from a common subsurface interface will line up across the seismogram.

It is also well known that as seismic detectors become displaced further and further from the shot points for the source of seismic energy, the relative amplitudes of the seismic reflections drop off due to divergence of the generally spherical wave front as it travels through the subsurface formation. It is known to apply automatic gain control (AGC) to the weaker reflections of a given trace so that the average amplitude of the trace is more close to constant, so as to enable more efficient analysis of the seismogram.

SUMMARY OF THE INVENTION

The present invention is directed to a method for processing seismic reflection signals obtained during a seismic exploration survey in which seismic acoustic energy is transmitted into a subsurface formation, reflected from subsurface interfaces, and recorded by receivers located at spaced-apart positions along a line of exploration.

Seismic reflection signals, recorded by the receivers are digitized to provide a plurality of digital data samples for each seismic reflection signal. A logarithmic value is determined for each digital data sample. These logarithmic values are plotted to provide a seismogram with the seismic reflection signals from the receivers being recorded in side-by-side trace relationship.

The traces are then compared to detect any trend in a select seismic survey parameter along the line of exploration.

After identifying any trend in a select seismic survey parameter, such trend may be adjusted or corrected to bring the actual value of the survey parameter back in line with a desired, or required, value for such survey parameter. Confirmation of the effects of such adjustment can be made by repeating the method of the present invention either in real-time during a survey operation or in later playback for designing a future survey operation.

DESCRIPTION OF THE PREFERRED EMBODIMENT

Before describing the method of the present invention relating to the processing of seismic reflection signals, a conventional seismic data acquisition system which may be used in the generating and gathering of seismic reflection signals in accordance with the present invention will first be described.

Figure 1:
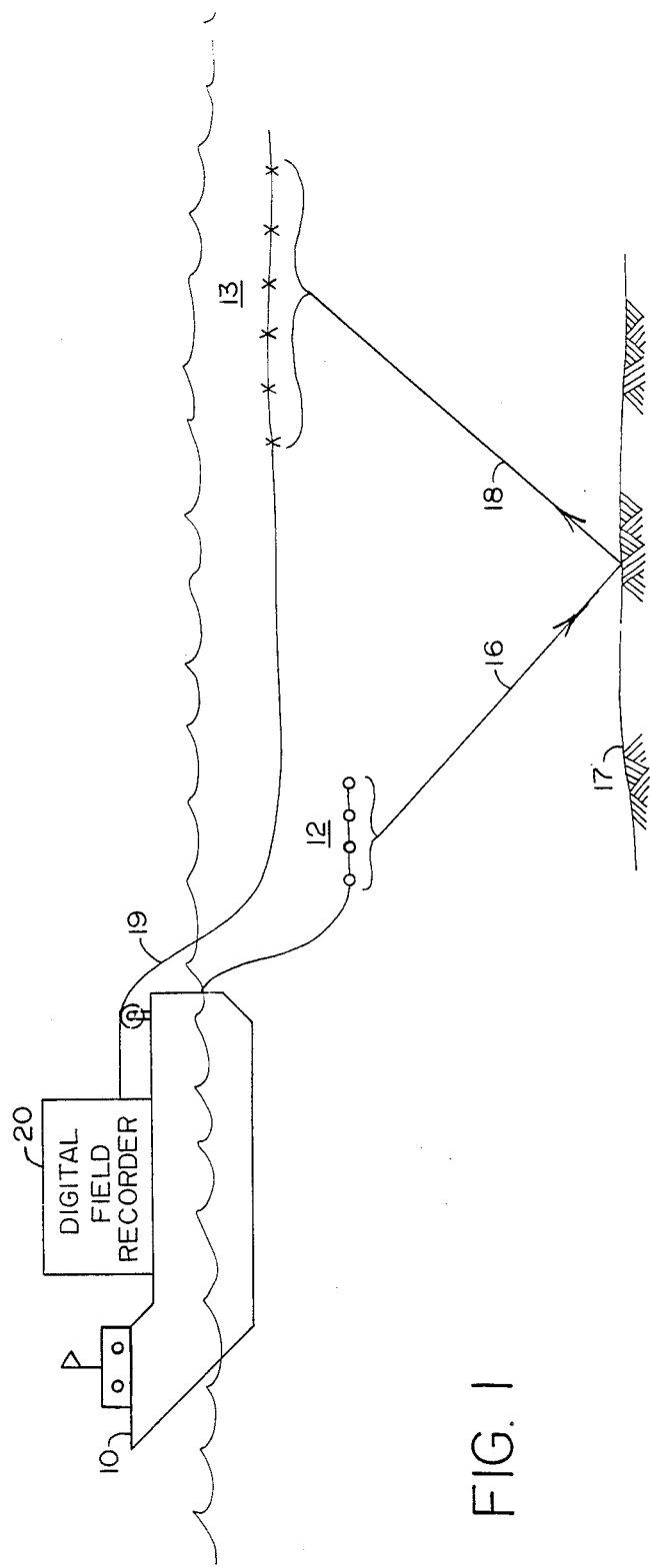
FIG. 1 illustrates a seismic exploration system useful in carrying out the method of the present invention.

While the method of the present invention may be carried out by either a land seismic exploration system or a marine seismic exploration system, FIG. 1 illustrates one marine seismic exploration system which has been successfully used in carrying out the invention. Referring briefly to FIG. 1, a vessel 10 traverses a seismic exploration line in surveying the subsurface formation beneath a water layer. An array of acoustic energy sources 12 is towed behind vessel 10. Also towed behind vessel 10 at a greater distance from the array 12 is an array 13 of acoustic receivers, or hydrophones. As the vessel 10 traverses a line of exploration, the source array is repetitively fired at a plurality of shot points to produce seismic pressure waves in the water layer. Each of the sources in the array 12 may be fired sequentially at each shot point to direct a pressure wave through the water by way of path 16 to subsurface interface 17 where it is reflected by way of path 18. As the acoustic pressure wave approaches the horizontal receiver array 13 by way of path 18 it is detected by each of the hydrophones in the array. Each hydrophone generates an electrical signal in response to receipt of the acoustic pressure wave. These hydrophone signals are connected by way of cable 19 to a digital field recorder 20 on board vessel 10 where they are recorded as side-by-side traces on a seismogram. A typical seismic source which is used in marine exploration is shown in U.S. Pat. No. 3,506,085 to George B. Loper. A linear array of sources suitable for use in marine exploration is described in U.S. Pat. No. 4,134,098 to William H. Ruehle. A typical field recording system is the Texas Instruments Model DFSV Digital Field Recorder. For more details as to the operation of such a marine seismic exploration system, reference may be made to U.S. Pat. No. 4,357,689 to William H. Ruehle, the teaching of which is incorporated herein by reference.

Having now briefly described the operation of a typical marine seismic exploration system for the generating and gathering of seismic reflection signals along a line of exploration, the method of processing seismic reflection signals in accordance with the present invention will now be described.

The invention was developed for the purpose of analyzing recorded seismic reflection signals for each shot point of seismic acoustic energy for amplitude effects created by various system parameters, such as acoustic energy source configuration and level, receiver array configuration and sensitivity, background level, noise level, instrument gain, cycle rate, etc. One of the purposes of this analysis is to permit an operator to make interactive adjustments to the seismic exploration system parameters during a real time survey. Further, there is a benefit to making a post-survey analysis for the development of future survey parameters or for input to further data processing operations.

Figure 2:
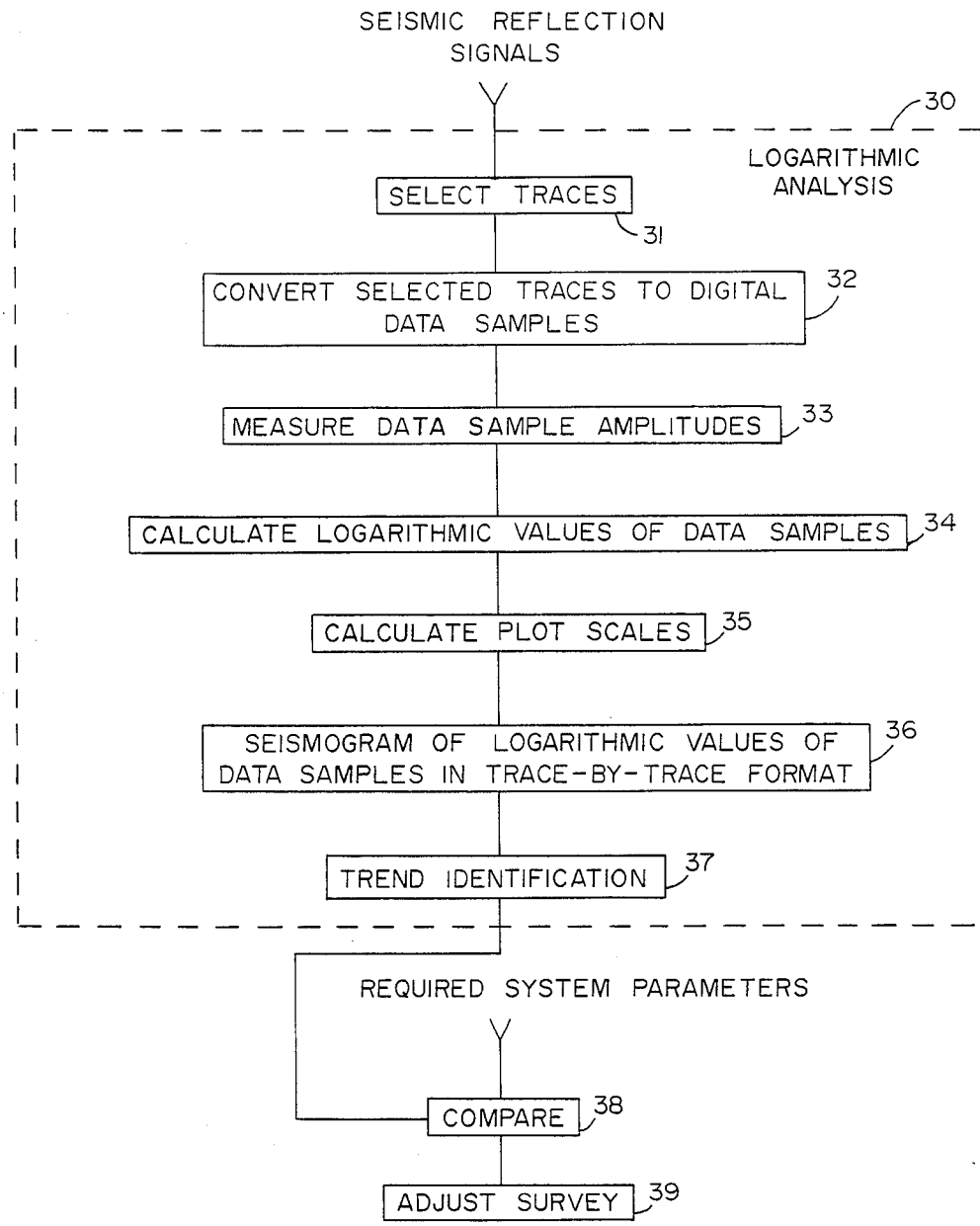
FIGS. 2 and 3 are flow charts depicting the steps involved in processing seismic data as might be recorded by the seismic exploration system of FIG. 1.
Figure 3:
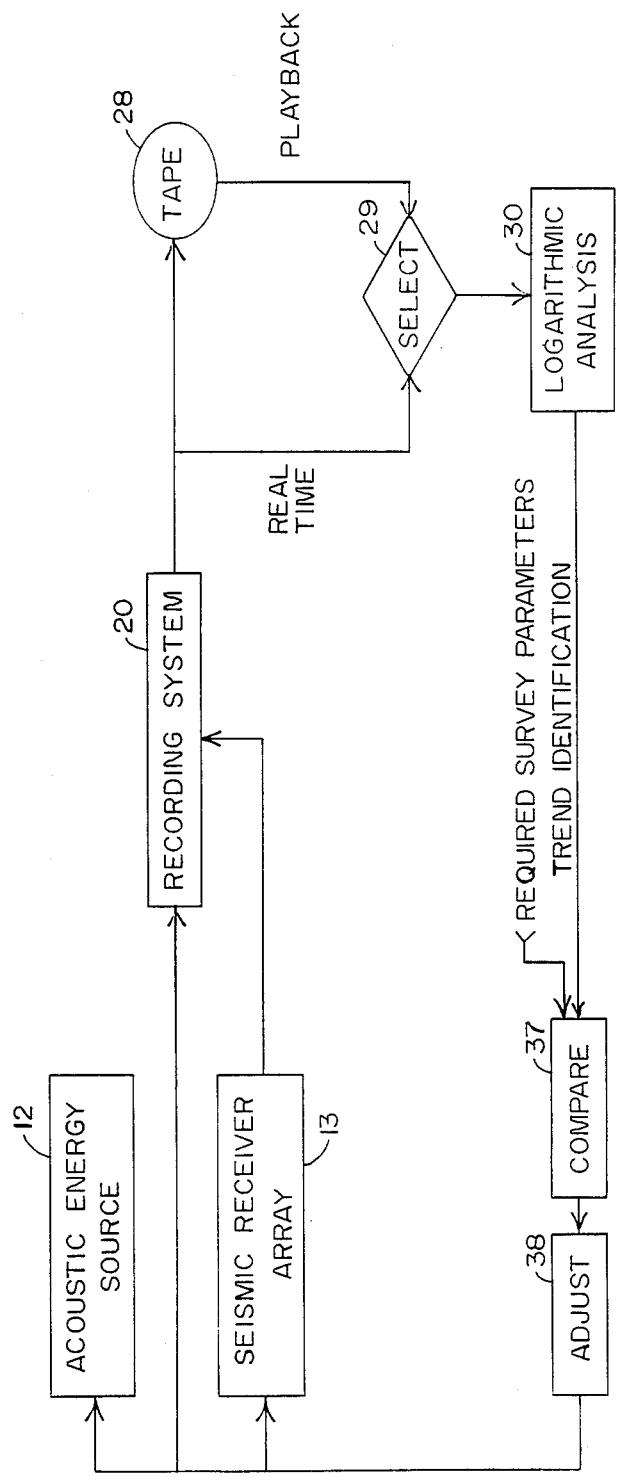
Figure 4:
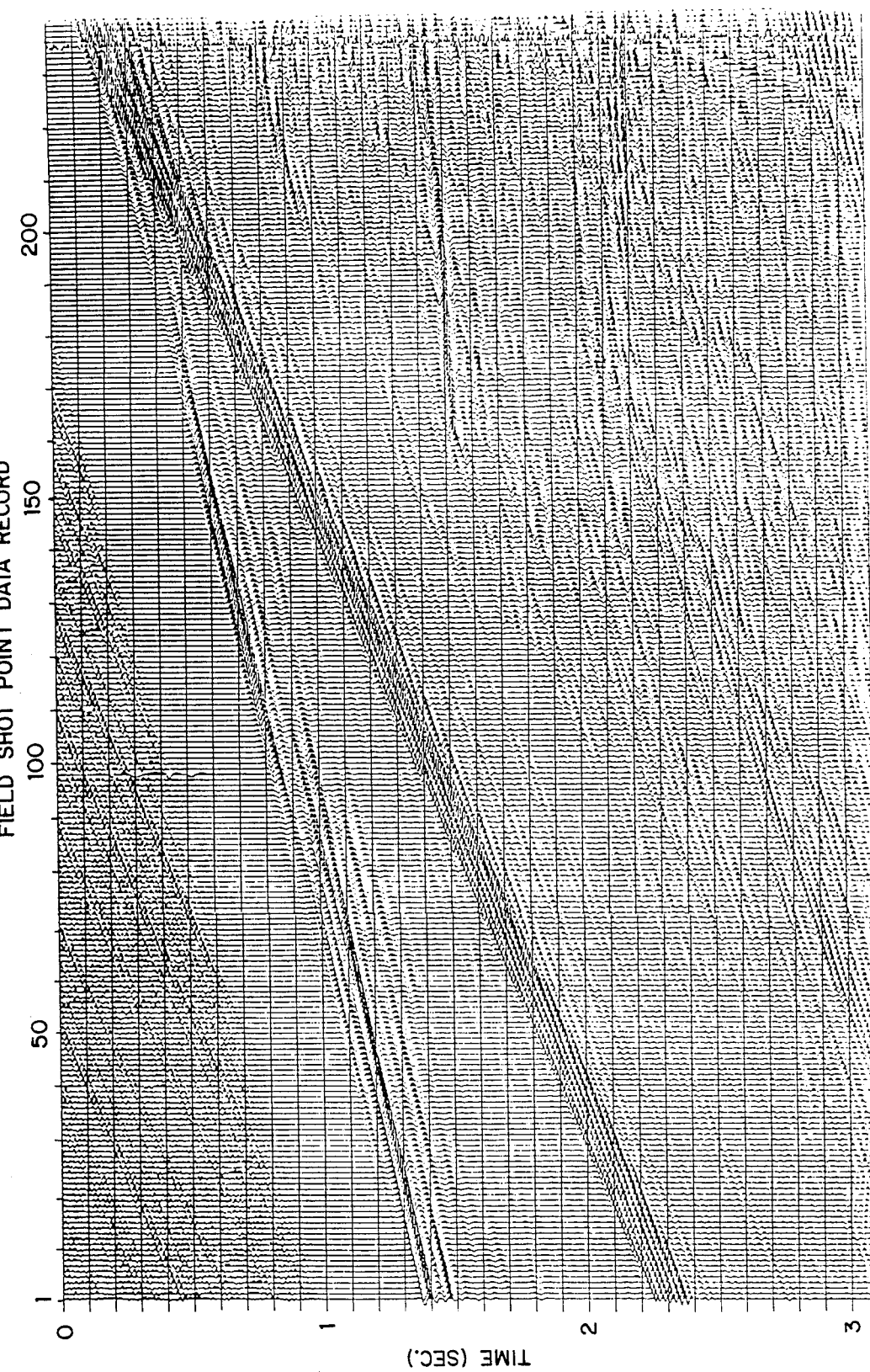
FIG. 4 represents a seismogram of seismic traces as might be recorded by the seismic exploration system of FIG. 1.

Referring now to FIG. 2, there is shown a flow chart of the steps to be carried out in the present invention. Seismic reflection signals recorded during one marine seismic exploration survey, and as illustrated in the seismogram of FIG. 4 are input, during either real-time survey operations or during post-survey processing to the logarithmic analysis process 30. Individual or multiple traces may be selected at step 31 and converted into digital data samples at step 32. Trace selection is dependent upon which system parameter effects on the reflection signals are to be observed, or determined, and adjustments made to such system parameters, either in real-time or in future surveys. For example, those traces that best reflect the effects of source gun pressure may be selected when it is desired to reduce distortion of shallow reflectors at the expense of the signal-to-noise ratio of deep reflectors.

The amplitudes of the data samples are then measured at step 33. Such measurements could be of a unitless number or converted to a pressure unit such as microbars. Conversion to pressure units would be a preferred means of quantifying the data. At step 34 the logarithmic values of the data samples are calculated.

At the next step 35, the scales for plotting the data samples are determined. The amplitude Y-axis plot scale is based on the maximum recordable signal levels as defined by the recording system parameters and receiver sensitivity and on the desired number of traces plotted per inch. The time X-axis plot scale is determined by the recorded trace length or desired number of inches per second of plotting. The log base 10 units are chosen as a means of permitting determination of the range of signals from the maximum to the minimum level on a single plot, that is, a range of 100,000 microbars to 1 microbar can be compressed such that all signals within the range can be contained on a single plot. Other units such as log base e could have been chosen for either plot axis dependent upon the desired display characteristics.

Next, the logarithmic plot of seismic traces is carried out at step 36 for each of the seismic reflection signals. In selecting the seismic traces to be processed in accordance with the present invention, it should be understood that the selected traces may be the outputs from a single receiver or, in the alternative, the outputs of several successively positioned receivers combined.

Figure 5:
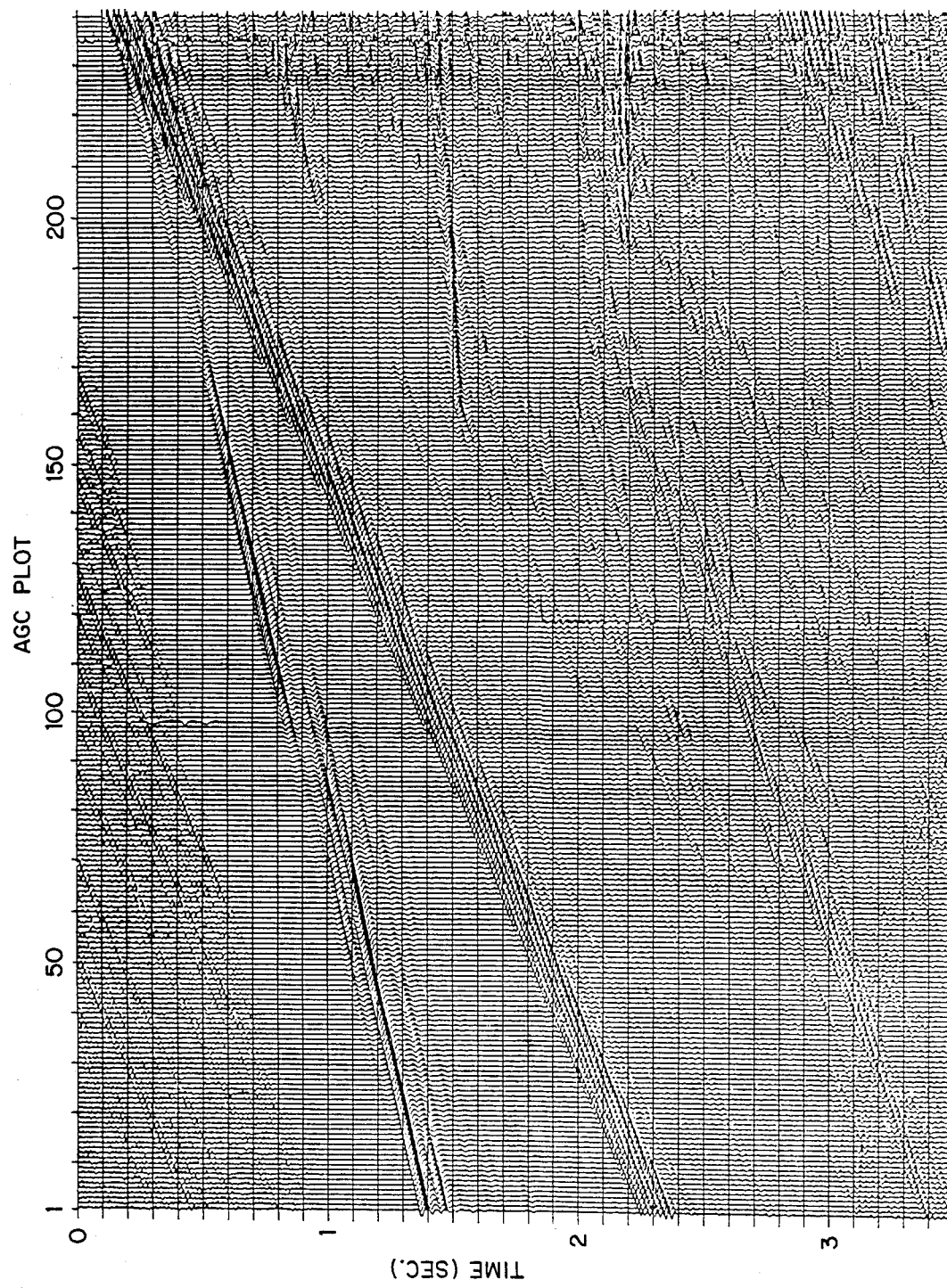
FIG. 5 represents the seismogram of FIG. 4 as processed by the prior art to generate an AGC plot.
Figure 6:
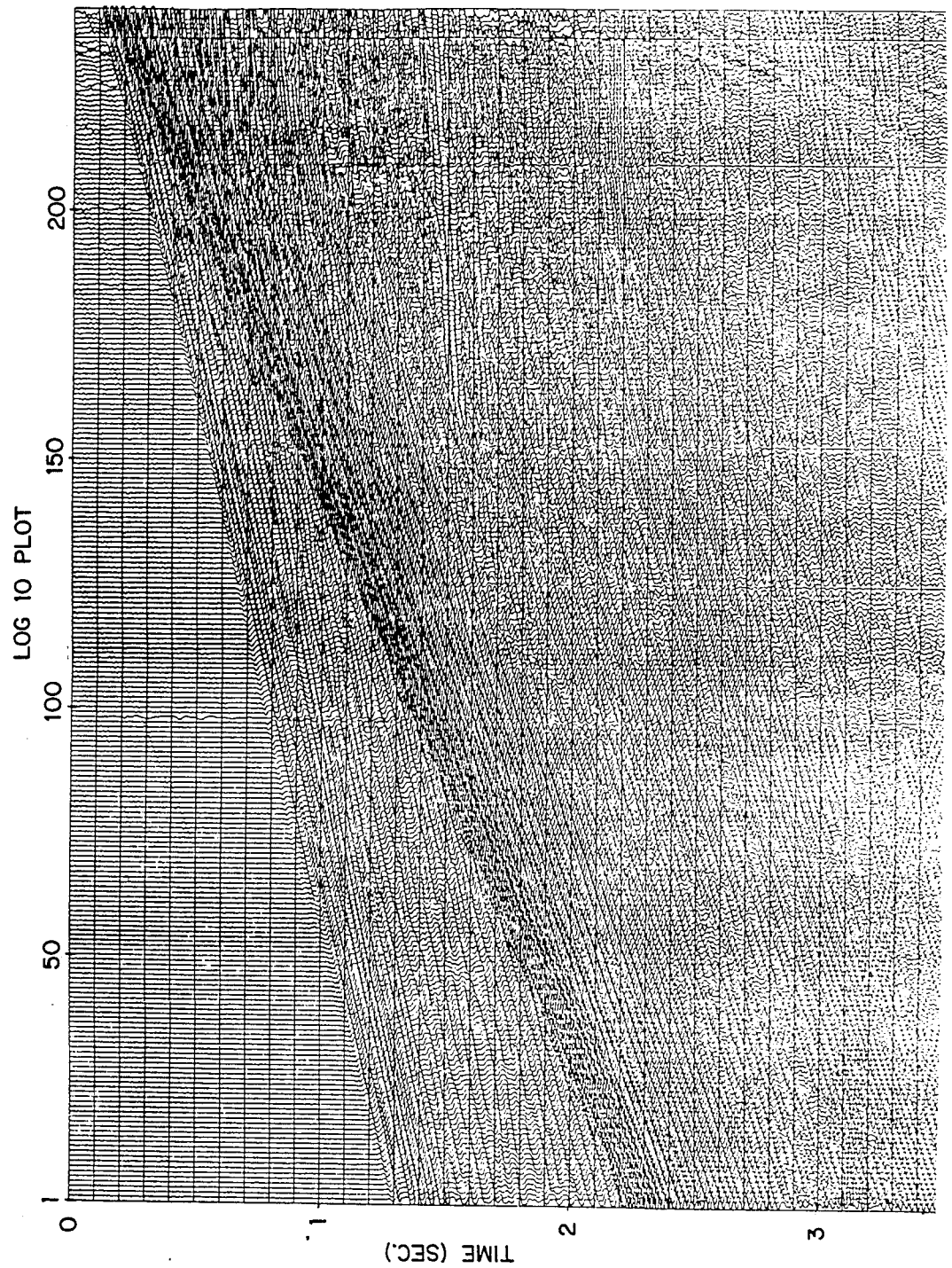
FIG. 6 represents the seismogram of FIG. 5 as processed by the method of the present invention to generate a logarithmic plot.

The next step 37, is to identify trends in actual system survey parameters away from required survey parameters. Such identification can be observed from a comparison of the logarithmically plotted traces. Any trend identification is then compared with required survey parameters at step 38. Correction or adjustment can then be made at step 39 to bring the actual values of the survey parameters back in line with the required values for such survey parameters. For example, in the prior art AGC plot of FIG. 5, trace 235 appears to be noisy. FIG. 6 is a logarithmic plot taken in accordance with the present invention of the same seismic traces as in FIG. 5. FIG. 6 shows that trace 235 is not noisy, but is instead dead (i.e. no signal recorded by the receiver) and further that traces 98, 125, 153 and 209 are weak. The reason for these abnormalities to be observable in FIG. 6 is several fold. Firstly, the AGC plot of FIG. 5 suppresses the displayed signal level on either side of strong reflectors such as the refraction and water bottom events. The logarithmic plot of FIG. 6 permits observation of weak signal interaction with the strong reflectors. Also in the AGC plot the true amplitude is not known even though the data was recorded in a gain mode that retains pressure level information from the receivers. The logarithmic plot maintains this information.

Further, the logarithmic plot enables the observation of signals over a 60 dB range (1000:1). The AGC plot limits observation to signals over a range of 24 dB (16:1), that is, the amplitude of a signal is suppressed from visual observation if the signal is 24 dB smaller than an adjacent signal.

The seismic survey from which the recordings of FIG. 4 was obtained employed a 6000 cubic inch point source array. A 3000 meter receiver array was employed with 240 receiver channels at 12½ meter group length. The source-to-near trace offset was 178 meters and the shot point interval was 25 meters.

This method of logarithmic analysis can be utilized on field recorded seismograms anywhere in the world to show the true amplitude effects throughout a seismic data record of energy source, receiver array configuration, and instrumentation, for example, on seismic trace data and noise signals. Recorded amplitude levels on tape resulting from adjustments to the seismic system can be considered that would optimize the system to a maximum number of properly performing traces in each seismogram at the time of conducting the survey.

While a preferred embodiment of the method of the present invention has been described and illustrated, numerous modifications or alterations may be made without departing from the spirit and scope of the invention as set forth in the appended claims.

I claim:

1. A method of conducting a seismic survey along a line of exploration, comprising the steps of:
   (a) traversing a line of exploration with a seismic survey system having an acoustic energy source, an array of spaced-apart receivers, and a recording system, (b) firing said acoustic energy source at a plurality of shot points along said line of exploration, (c) recording seismic reflection signals received by said array of receivers for each of said shot points, (d) digitizing said recorded seismic reflection signals to provide a plurality of digital data samples for each of said recorded seismic reflection signals, (e) determining the logarithmic value for each of said digital data samples, (f) plotting the logarithmic values of said digital data samples to provide a seismogram with the seismic reflection signals from said receivers being recorded in side-by-side trace relationship, (g) comparing the logarithmically plotted traces of said digital data samples to detect a trend in one or more select seismic survey parameters along said line of exploration away from a required value for said select seismic parameter, and (h) adjusting said select parameter to bring the value of said select parameter for which said trend is detected back in line with the required value for said select parameter.

2. The method of claim 1 wherein said step of adjusting said select parameter following said trend detection is carried out in real time during said seismic survey to optimize the number of properly performing traces in the seismogram during said real time data acquisition.

* * * * *